T. Worrall,
Bench Plane.
No. 418. Fig: 5. Reissued Dec. 23. 1856.
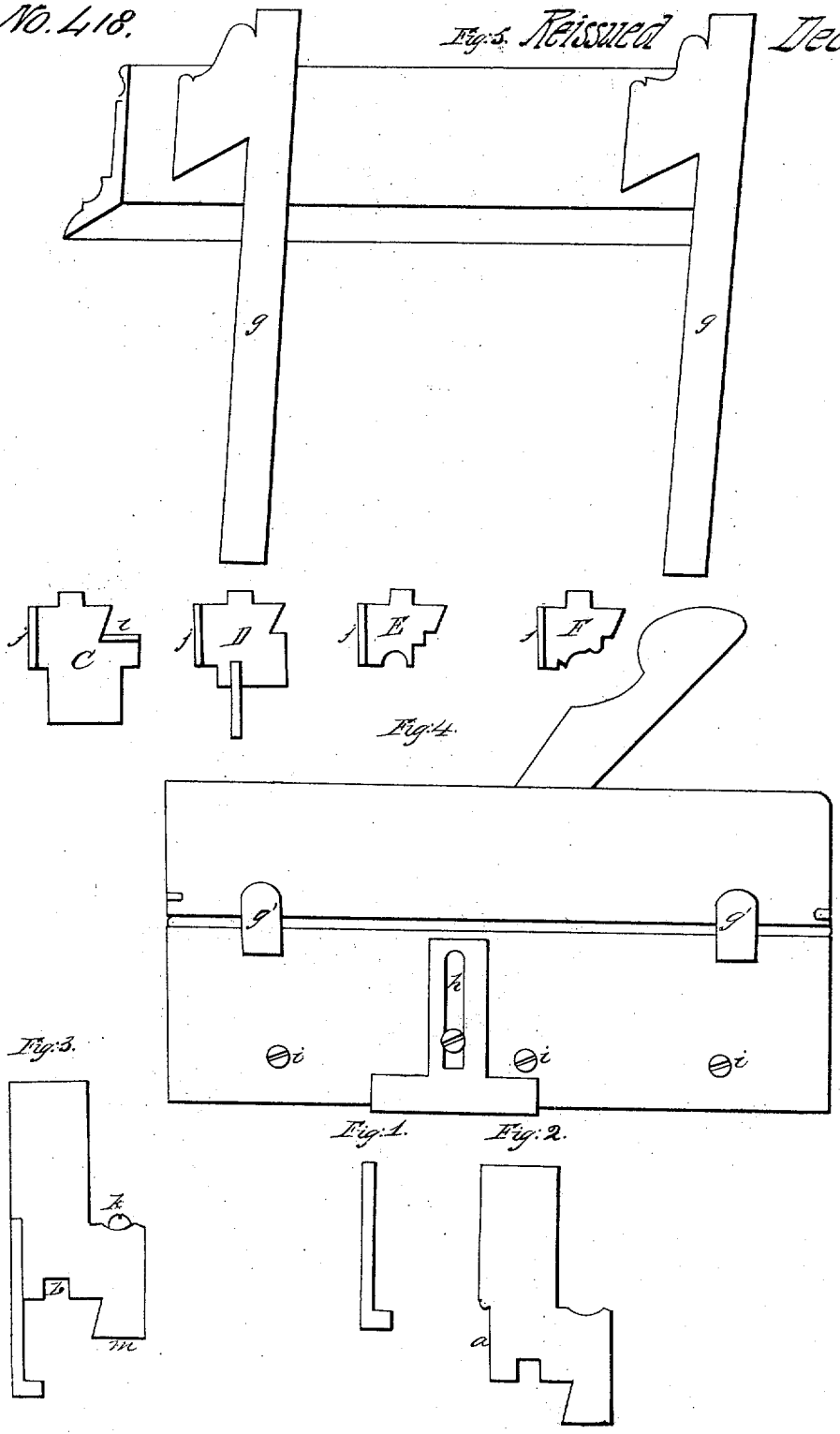
N. PETERS, PHOTO-LITHOGRAPHER, WASHINGTON, D. C.

UNITED STATES PATENT OFFICE.

THOMAS D. WORRALL, OF LOWELL, MASSACHUSETTS, ASSIGNOR TO THOS. D. WORRALL, (ALIAS THOS. WORRALL.)

MULTIFORM MOLDING-PLANE.

Specification forming part of Letters Patent No. 11,635, dated August 29, 1854; Reissue No. 418, dated December 23, 1856.

*To all whom it may concern:*

Be it known that I, THOMAS D. WORRALL, late of Mount Holly, in the county of Burlington and State of New Jersey, but now residing in Lowell, in the county of Middlesex and State of Massachusetts, have invented an Improvement in the Carpenter's Molding or Grooving Plane; and I do hereby declare that the same is fully described and represented in the following specification, the accompanying drawings, and the letters and figures of reference marked thereon.

The nature of my invention is to be found in the peculiar manner in which the improved plane is constructed—viz., with a molding part or slide separate from the handle part, body, or part held in the hand or hands of a person, such parts being fastened together by means of plates and screws or equivalent devices, whereby the plane, by a series of such slides properly formed for the purpose, is adapted to the manufacture of moldings, grooves, rabbets, or tongues, as occasion may require.

To enable others skilled in the art of plane-making or joinery to make and use my invention, I will proceed to describe its construction and mode of operation.

In carrying out my invention a dovetail and groove may be made in the face of a plane stock or body, to which and with respect to such dovetail and groove, as shown in the drawings, a plate may be attached by screws or rivets, such plate having holes made through it for the reception of screws for fastening the slide to the body of the plane, or that part from which the handle usually projects, the same being sometimes constructed without any handle.

Figure 1 in the drawings represents an end view of the plate. Fig. 2 is an end view of the main body of the plane dovetailed and grooved, ready for reception of the plate, which is fixed in the recess *a*, and with the dovetail and groove forms the space or opening *b*, for reception of the slide or separate part, end views of which under different forms are given at C, D, E, and F. Fig. 3 exhibits an end view of the plane with the metallic plate attached. Fig. 4 denotes a side view of such plane and its brass or metallic plate, the same being shown as provided with holes or passages *g′g′*, extending transversely through such, and for the reception of the arms *g g* of the guide (see Fig. 5) of the "plow" and sash-fillister.

If we take the slide C and introduce it into the space *b* of the plane-stock, we shall have a sash-fillister body complete, the cutter or molding iron being applied in the ordinary way. So, if we remove slide C and put slide D in the place of it, we shall have a plow-plane body complete. The stop *h* on the side of the plane, and which is formed as seen in Fig. 4, is adjustable, and is to regulate the depth of groove made by the plow or that of the rabbet made by the fillister. The two planes thus formed only require the guide, Fig. 5, or the stop *h*, Fig. 4, to be applied to them. If for the slide D we substitute the slide F, we have a molding-plane. So, if we desire to make up a plane adapted to form any molding, we have only to have a slide and cutter suitable therefor, and apply such to the stock or handle part. Each of the slides is to be firmly fastened to the bed-stock or handle part of the plane by clamps or screws, as seen in the plate on Fig. 4, and marked *i i i*. These screws pass through the plate and into another plate, *j*, on the slide, and should additional firmness be necessary, which may be the case when the plane is required to be constructed so as to be capable of striking or forming a very wide molding, such may be obtained by passing a screw through the plane, as seen at *k* in Fig. 3, and into a plate, *l*, (shown in the figure representing slide C,) the same serving to hold the slide firmly against the base *m*, Fig. 3, of the plane.

What, therefore, I claim as my improvement in planes is—

The combination of a separate molding part or slide with the handle-supporting part, or body of the plane, and applied thereto by means of plates and screws or equivalent devices, substantially as specified, and for the purpose not only of enabling it to be removed from said handle part or body, but to allow another such a slide, (provided with a plane iron or cutter,) whatever may be its pattern, to be used in the application of or in combination with such handle part or body, as circumstances may require.

THOS. D. WORRALL.

Witnesses:

E. HUNTINGTON,

T. F. CALDICOTT.